United States Patent [19]

Shpak

[11] Patent Number: 5,425,230
[45] Date of Patent: Jun. 20, 1995

[54] GAS DISTRIBUTION STATION WITH POWER PLANT

[75] Inventor: Vilen N. Shpak, Kharkov, Russian Federation

[73] Assignee: Aktsionernoe Obschestvo "Kriokor", Moscow, Russian Federation

[21] Appl. No.: 185,920
[22] PCT Filed: May 24, 1993
[86] PCT No.: PCT/RU93/00117
  § 371 Date: Jan. 19, 1994
  § 102(e) Date: Jan. 19, 1994
[87] PCT Pub. No.: WO93/24785
  PCT Pub. Date: Dec. 9, 1993

[30] Foreign Application Priority Data

May 25, 1992 [RU] Russian Federation ............ 5056388

[51] Int. Cl.$^6$ ............... F02C 3/22; F02C 6/00
[52] U.S. Cl. ................ 60/39.181; 60/39.465
[58] Field of Search ............ 60/39.12, 39.181, 39.465, 60/39.511

[56] References Cited

U.S. PATENT DOCUMENTS

| | | | |
|---|---|---|---|
| 3,107,482 | 10/1963 | Fono | 60/39.02 |
| 3,525,218 | 8/1970 | Buss | 60/39.02 |
| 4,273,508 | 6/1981 | Fomichev | 60/39.281 |
| 4,418,530 | 12/1983 | Bodrov et al. | 60/39.181 |

FOREIGN PATENT DOCUMENTS

| | | |
|---|---|---|
| 0004398 | 10/1979 | European Pat. Off. . |
| 0293206 | 11/1988 | European Pat. Off. . |
| 1468311 | 3/1977 | United Kingdom . |
| 2103354 | 2/1983 | United Kingdom . |

*Primary Examiner*—Louis J. Casaregola
*Attorney, Agent, or Firm*—Ladas & Parry

[57] ABSTRACT

A gas distribution station with a power plant using the energy of the gas in a gas main (6) by removing gas from the gas main (6) and supplying the gas to a first heat exchanger (5) to be pre-heated by a back gas flow from a turbo-expander (1). From the heat exchanger (5), the gas flows to a second heat exchanger (4) to be heated by combusted gases of a gas turbine engine (3), and the heated gas then proceeds to the turbo-expander (1). The gas is expanded in the turbo-expander (1) which drives an electric generator (2) also drivingly connected to the gas turbine engine (3). The expanded and partially cooled gas from the turbo-expander flows to the heat exchanger (5) for pre-heating the gas withdrawn from the gas main and then into the gas main (6) downstream of a pressure reducer (7) at a temperature insignificantly above the temperature of the gas in the gas main (6) upstream of the pressure reducer (7).

3 Claims, 1 Drawing Sheet

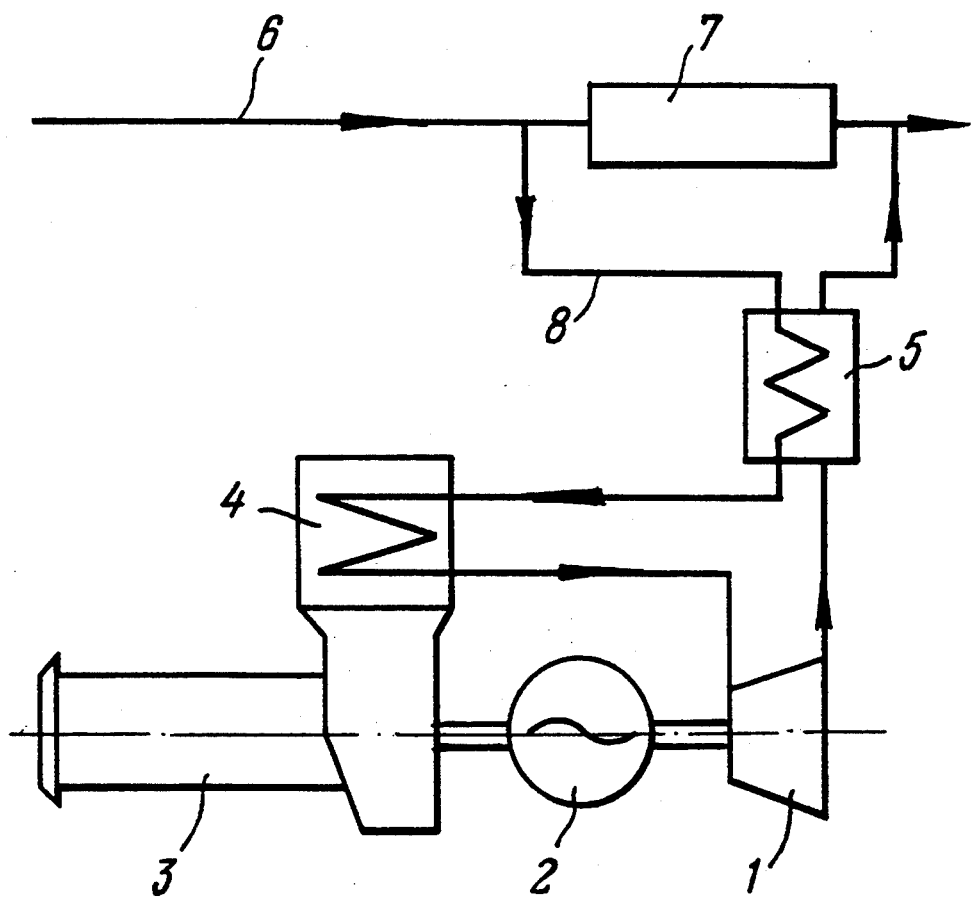

GAS DISTRIBUTION STATION WITH POWER PLANT

TECHNICAL FIELD

The invention relates to gas main equipment, more specifically to a gas distribution station with a power plant using the gas energy of the gas main.

PRIOR ART

Known in the art is a gas distribution station comprising a turbo-expander for actuating an electric generator connected at the input to a gas main before a reducer and at the output-behind the latter (Journal "Gazovaya promyshlennost" N II,1988, Moscow, cover page 4).

The conventional installation cannot be used in practice, with a pressure differential $> 1,5-2$ on the reducer (turbo-expander) because of a considerable drop of temperature thereat of natural gas behind the reducer (turbo-expander), and under the strength conditions of gas lines, gas cannot be fed thereinto after reducing at a temperature below 10° C.

And the pre-heating of gas to an initial temperature in a heat-exchanger utilizing the heat of burnt gas reduces utilization to zero, which is why such installations find no application in the given field.

Also known is a gas distribution station comprising a turbo expander for actuating an electric generator, a gas-turbine engine with the electric generator, the heat of whose burnt gases is used for pre-heating the natural gas removed from a gas main before a reducer and fed to the turbo-expander.

Owing to the pre-heating of gas at the input to a turbo-expander of the conventional station, there is increased power generated by the latter as is the gas temperature behind a reducer, which permits expanding the range of its use, including the above-identified pressure differential $> 1,2-2$(EP,A2 No. 0004398).

The conventional station is not efficient enough due to the incomplete utilization of burnt gases because the insulation used on gas pipe lines does not enable one to considerably increase the temperature of said burnt gases behind an expansion valve (over 70° C.) according to strength conditions thereof and also brings about a limitation of the transmissive capacity of the gas pipe line and an increased resistance in the latter due to an increase in the gas volume with its invariable mass flow rate.

SUMMARY OF THE INVENTION

It is the principal object of the present invention to eliminate restrictions of the temperature conditions of a gas pipe line, to enhance efficiency of the power plant of a station and to improve the latter's reliability.

Said object is accomplished owing to the fact that in a gas distribution station with a power plant comprising a gas main with a reducer, a gas—turbine engine with a heat exchanger-utilizer at the output for heating the gas removed from the gas main before the reducer, and a turbo-expander with an electric generator, and along with this, the input of the turbo-expander is connected to the output of the heat exchanger-utilizer, the provision is made of a heat exchanger-regenerator for pre-heating said gas taken away. Moreover, the heat-exchanger-regenerator is mounted before the heat-exchanger-utilizer and connected, as to a heating medium, with its input and output to respectively the output of the turbo-expander and the gas pipe line after the reducer, and as to a heated medium, respectively with the input—to the gas main before the reducer and with the output—to the input of the heat exchanger-utilizer.

In the gas distribution station, a gas turbine engine can be connected kinematically with the electric generator of the turbo-expander.

BRIEF DESCRIPTION OF THE DRAWINGS

The present invention is described by a specific embodiment which is diagrammatically illustrated in the sole FIGURE of the drawing by a gas distribution station having a power plant:

DETAILED DESCRIPTION OF A EMBODIMENT OF THE INVENTION

A gas distribution station is shown in the drawing and comprises a gas main 6 with a reducer 7, and a pipe line 8 for the gas to be withdrawn into a power plant, comprising a turbo-expander 1, an electric generator 2, a gas turbine engine 3, a heat exchanger-utilizer 4, and a heat exchanger-regenerator 5.

Natural gas is taken away from the gas main 6 before the reducer 7 to be admitted via the pipe line 8 to the heat exchanger-regenerator 5, where it is warmed by a back gas flow from turbo-expander 1. From the heat exchanger-regenerator 5, the gas is first admitted to the heat exchanger 4 to be pre-heated by the burnt gases of the gas turbine engine 3 and then to the turbo expander 1, wherein said gas is expanded with the performance of work transmitted to the electric generator 2, to which the gas turbine engine 3 is connected kinematically to transmit its generated power to the electric generator 2.

The expanded and partially cooled gas is admitted after the turbo-expander 1 to the heat-exchanger-regenerator 5 for pre-heating the gas withdrawn from the gas main to be subsequently reintroduced into the gas main after the reducer 7, having been cooled to a temperature insignificantly (by 10°-50° C.) exceeding the gas temperature in the gas main 6.

The pre-heating of the gas from the gas main in a heat exchanger-regenerator with the heat of the burnt gas in a turbo-expander makes it possible to enhance efficiency and reliability of a gas distribution station by way of increasing the efficiency of a power plant incorporated therein, subsequent to regeneration of the heat of gases escaping from the turbo-expander and optimization of the temperature of the gas coming out of the turbo-expander into the gas main in consequence of a reduction of hydroloss in said gas main and an increase in the latter's strength reliability.

Thus, mounting at the output from a turbo-expander of a heat exchanger-regenerator reducing the temperature of gas to be fed to a gas pipe line enables one to also overcome a restriction as to a temperature rise in pre-heating the gas before the turbo-expander.

The kinematic coupling of a gas turbine engine with the electric generator of a turbo-expander protects the plant also in the event of emergency electric load shedding, because the compressor of the gas turbine engine is a superload in speed-up.

A system for controlling the plant is simplified, inasmuch as the necessity falls away in maintaining a frequency of rotation by a separate system because this function is performed by the system of control of a gas turbine engine by way of effecting the power of a turbo-expander through a change of the temperature of burnt gases.

Industrial applicability

The invention will find application in transportation of natural gas over mains, in supplying the natural gas to users (industrial plants, say, chemical combines, thermal electric stations and also municipal networks).

I claim:

1. A gas distribution station comprising:

a gas main containing a pressure reducer, a power plant, a heat exchanger having an inlet connected to said gas main upstream of said pressure reducer for flow of gas from the gas main through the heat exchanger, said power plant including a gas turbine engine having a second heat exchanger through which combusted gases from the gas turbine engine pass, said first heat exchanger being connected to said second heat exchanger so that gas from the first heat exchanger flows to the second heat exchanger, whereat said gas is heated by the combusted gasses passing through the second heat exchanger, a turbo-expander connected to the second heat exchanger for receiving the heated gas therefrom which drives said turbo-expander and undergoes cooling therein, said turbo-expander having a gas outlet at which the gas is discharged in an expanded and still heated state, an electric generator connected to said turbo-expander for being driven thereby, said gas outlet of said turbo-expander being connected to said first heat exchanger for passage through the first heat exchanger of the heated gas from the turbo-expander, said heated gas from the turbo-expander undergoing heat exchanger with the gas passing through the first heat exchanger coming from the gas main to heat said gas coming from the gas main, said first heat exchanger being connected to said gas main at a locating downstream of said pressure reducer to supply to said gas main the heated gas from the first heat exchanger after said heated gas has undergone heat exchange in said first heat exchanger.

2. A gas distribution station as claimed in claim 1, wherein said electric generator is drivingly connected to said gas turbine engine.

3. A gas distribution station as claimed in claim 1, wherein the gas when returned to said gas main from the first heat exchanger is at a temperature 10° to 50° C. greater than the temperature of the gas in the gas main upstream of said pressure reducer.

* * * * *